(12) United States Patent
     Enty

(10) Patent No.: US 11,743,739 B1
(45) Date of Patent: Aug. 29, 2023

(54) MUNICIPAL WIRELESS NETWORK

(71) Applicant: Austin Enty, Fort Worth, TX (US)

(72) Inventor: Austin Enty, Fort Worth, TX (US)

( * ) Notice: Subject to any disclaimer, the term of this patent is extended or adjusted under 35 U.S.C. 154(b) by 0 days.

(21) Appl. No.: 17/358,269

(22) Filed: Jun. 25, 2021

(51) Int. Cl.
| | |
|---|---|
| *G06Q 10/10* | (2023.01) |
| *H04W 16/18* | (2009.01) |
| *H04W 84/12* | (2009.01) |
| *H04W 84/04* | (2009.01) |

(52) U.S. Cl.
CPC .......... *H04W 16/18* (2013.01); *H04W 84/042* (2013.01); *H04W 84/12* (2013.01)

(58) Field of Classification Search
CPC ....... G01S 13/82; G01S 13/878; Y02A 30/60; H04W 64/00; H04W 84/18; G01C 21/343; G01C 21/3484; G06N 20/00; G06Q 10/1097; G06Q 50/30; H05B 47/175; F21V 33/00; G08B 25/009; F21S 8/086; F21S 2/00; F21W 2131/103
See application file for complete search history.

(56) References Cited

U.S. PATENT DOCUMENTS

| | | | | |
|---|---|---|---|---|
| 8,502,670 | B2* | 8/2013 | Cha .......... | G01S 13/82 340/572.1 |
| 2010/0295943 | A1* | 11/2010 | Cha .......... | G01S 13/82 340/539.13 |
| 2013/0044488 | A1* | 2/2013 | Hreish ................ | H05B 47/175 362/253 |
| 2020/0210960 | A1* | 7/2020 | Soryal ................ | G01C 21/343 |

* cited by examiner

*Primary Examiner* — Jung Liu
(74) *Attorney, Agent, or Firm* — Kenneth L. Tolar

(57) ABSTRACT

A municipal wireless network includes a base unit having a twist-style electrical plug that mates with an electrical receptacle on a typical streetlamp. Within the base-unit interior is a long-range wireless transceiver, such as that commonly referred to as Wi-Fi. The transceiver is in wireless communication with a central hub that is connected to a server via a wired or wireless phone system. Accordingly, when a base unit is connected to each of the streetlamps within a given jurisdiction, a universal wireless network is established.

8 Claims, 1 Drawing Sheet

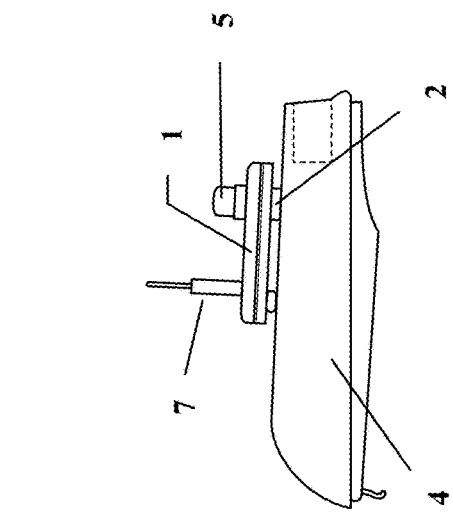
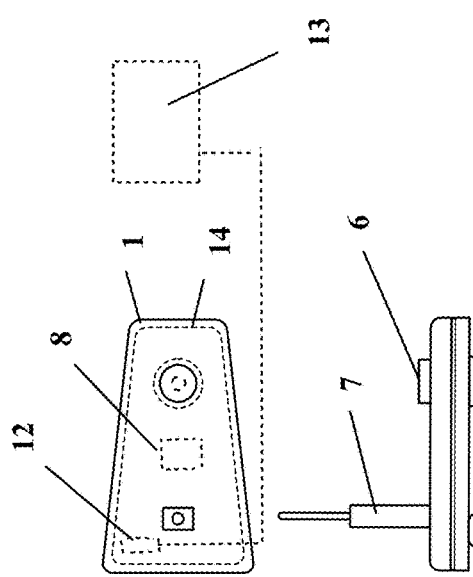
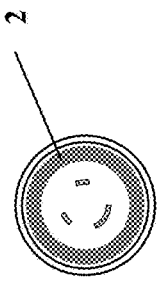
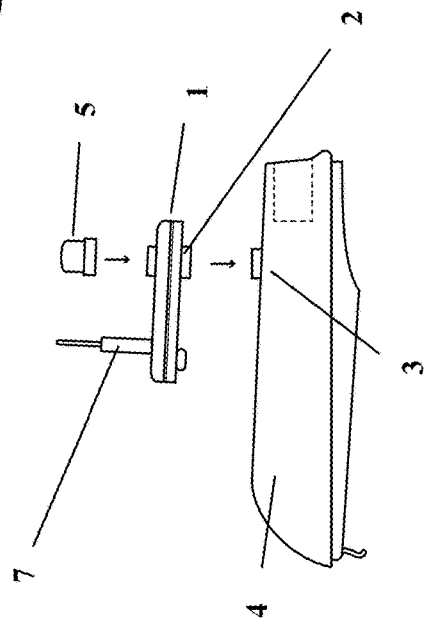
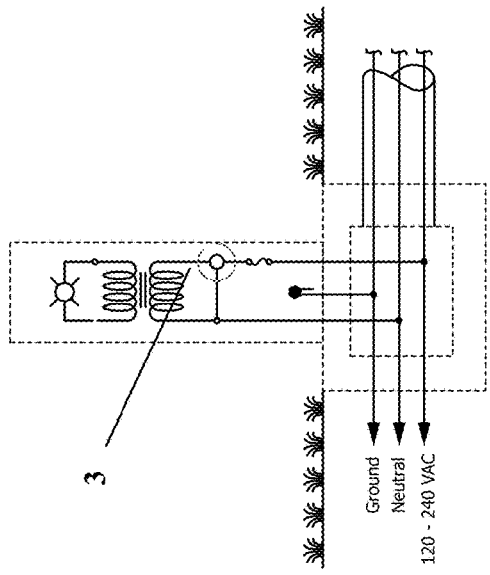

MUNICIPAL WIRELESS NETWORK

CROSS REFERENCE TO RELATED APPLICATIONS

None.

BACKGROUND OF THE INVENTION

The present invention relates to a wireless transmitter incorporated with a plurality of streetlamps to create a mesh network that universally covers a given municipality.

DESCRIPTION OF THE PRIOR ART

Wireless networks using Wi-Fi are ubiquitous, particularly in urban areas. Citizens are becoming more dependent upon such networks to perform daily tasks, such as sending emails, accessing bank accounts, or purchasing online products. Initially, wireless networks were only available at certain retail establishments, such as coffee shops or restaurants. In order to increase availability, some municipalities have begun offering wireless networks in certain locations. However, the range and accessibility of such networks are often extremely limited to specific geographic locations.

Accordingly, there is currently a need for a device that increases the availability of a wireless network. The present invention addresses this need by providing a wireless-network transmitter that is incorporated into each of a number of streetlamps to provide universal coverage within a municipality.

SUMMARY OF THE INVENTION

The present invention relates to a municipal wireless network comprising a base unit having a twist-style electrical plug that mates with an electrical receptacle on a typical streetlamp. Within the base-unit interior is a long-range wireless transceiver, such as that commonly referred to as Wi-Fi. The transceiver is in wireless communication with a central hub that is connected to a server via a wired or wireless phone system. Accordingly, when a base unit is connected to each of the streetlamps within a given jurisdiction, a universal wireless mesh network is established.

It is therefore an object of the present invention to provide a wireless network transmitter that is easily integrated with a municipal streetlamp.

It is another object of the present invention to provide a wireless network that conveniently provides universal coverage within a municipality.

Other objects, features, and advantages of the present invention will become readily apparent from the following detailed description of the preferred embodiment when considered with the attached drawings and the appended claims.

BRIEF DESCRIPTION OF THE DRAWINGS

FIG. 1 is an isolated, top view of the base unit of the municipal wireless system according to the present invention.

FIG. 2 is a side view of the base unit of FIG. 1.

FIG. 3 depicts the base unit properly installed on a streetlamp.

FIG. 4 is an exploded view of the base unit, streetlamp and photosensor depicted in FIG. 3.

FIG. 5 depicts the lighting circuit of a typical streetlamp.

FIG. 6 is an isolated view of the base unit electrical plug.

DESCRIPTION OF THE PREFERRED EMBODIMENT

The present invention relates to a municipal wireless network comprising a base unit 1 having a twist-style, waterproof electrical plug 2 that mates with an electrical receptacle 3 on a typical streetlamp 4. A photosensor 5 typically seats within the receptacle 3 for automatically activating the streetlamp in the absence of ambient light. Accordingly, the upper surface of the base unit includes an identical receptacle 6 for mating with the photosensor 5 plug so that the streetlamp functions normally when the base unit is connected thereto.

Within the base-unit interior is a long-range wireless transceiver 8, such as that commonly referred to as Wi-Fi, or a cellular radio transmitter of the type in a 5G network. If Wi-Fi is used, the minimum specifications are as follows:

| Description | Specification |
| --- | --- |
| Frequency range | 2.400 to 2.475 GHz |
| Output power | Up to 29 dBm ± 1 dB |
| Receiver sensitivity | Down to −97 dBm ± 1 dB |
| Antenna | 6 dB omnidirectional |
| Enclosure | Outdoor UV stabilized plastic |
| Maximum power consumption | 10 watts |
| Input voltage | 12 VDC |
| Operating temperature | − 20 to +70° C. |
| Operating humidity | 5 to 95% condensing |
| Wired network interface | 1 each 10/100 base-TX Ethernet |
| Government approval | FCC part 15.247, IC RS210 |
| Range | 500 feet indoors, 0.5-mile free air |

One base unit functions as a hub which is in direct communication with a server via a wireless phone connection or a fiber optic phone line. Therefore, the hub can transmit to nearby base units to create a mesh network of transceivers that can cover an entire municipality. An antenna 7 on the upper surface of the base unit enhances the transmission range of the wireless transceiver.

The base unit may also include an RFID module 12 in discrete communication with a plurality of transponders 13 that can each be affixed to a variety of objects for asset monitoring or tracking. Therefore, each base-unit RFID module can communicate with a given transponder 13 to transmit information through the wireless network to a home unit connected to the server. If the RFID modules operate within the 115 KHz range, its antenna 14 is wrapped around the housing interior. If it operates within the 2.5 GHz range, its antenna is mounted on the housing exterior. The RFID module and transponders allow a supervisor to track municipal vehicles, determine traffic volume, adjust stop-light frequencies, open parking-lot gates and remotely perform other similar tasks.

As is readily apparent from the detailed description set forth above, when a base unit 1 is connected to each of the streetlamps 4 within a given jurisdiction, a universal wireless network is established with virtually limitless boundaries. However, the above-described device is not limited to the exact details of construction and enumeration of parts provided herein. Although the device has been primarily depicted and described as a wireless network, it could also be used as a wireless phone booster/amplification device that is similar to a wireless phone tower to enhance transmission and reception. By placing the wireless transmitters on streetlamps, a mesh network can be established wherein each streetlamp becomes a node that can transmit its signal to any streetlamps within its operating range. Downstream streetlamps can then transmit to other streetlamps within their operating range, etc. to cover a wider area without erecting additional infrastructure. The device could also have virtually any existing mobile phone or 5G network capabilities in addition to or in lieu of Wi-Fi transmitters. Each base unit could also include additional components, such as a cellular phone repeater, a Bluetooth communication hub, or additional asset tracking hardware. Furthermore, the size, shape, and materials of construction of the various components can be varied.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The invention claimed is:

1. In combination with a streetlamp having an electrical receptacle on an exterior surface with a photosensor removably seated therein for activating a light mounted on said streetlamp, a municipal wireless network comprising:
   - a base unit having an electrical connector that mates with said electrical receptacle on said streetlamp, and a second electrical receptacle that mates with said photosensor;
   - a long-range wireless transceiver received within said base unit;
   - a network server in communication with said long-range wireless transceiver.

2. The combination according to claim 1 wherein said long-range wireless transceiver is a Wi-Fi transmitter.

3. The combination according to claim 1 wherein said long-range wireless transceiver is a 5G network.

4. The combination according to claim 1 further comprising:
   - an RFID module within said base unit;
   - a plurality of transponders, each of said transponders affixed to an object and in discrete wireless communication with said RFID module for monitoring and tracking said object.

5. The combination according to claim 4 wherein said base unit further comprises a cellular phone repeater, a Bluetooth communication hub, and asset tracking hardware.

6. The combination according to claim 1 wherein said electrical connector is waterproof.

7. In combination with a streetlamp having a first electrical receptacle on an upper exterior surface with a photosensor removably seated therein for activating a light mounted on said streetlamp, a municipal wireless network comprising:
   - a base unit having a top surface and a bottom surface;
   - an electrical connector on the bottom surface of said base unit that mates with said electrical receptacle on the upper surface of said streetlamp;
   - a second electrical receptacle on the top surface of said base unit that is identical to the first electrical receptacle that mates with said photosensor;
   - a long-range wireless transceiver received within said base unit;
   - a network server in communication with said long-range wireless transceiver.

8. The combination according to claim 7 wherein said electrical connector is waterproof.

* * * * *